April 22, 1969
H. J. BOLL
3,440,351
TELEPHOHE TRANSMITTER CIRCUIT EMPLOYING
VARIABLE CAPACITANCE MICROPHONE
Filed Sept. 9, 1966
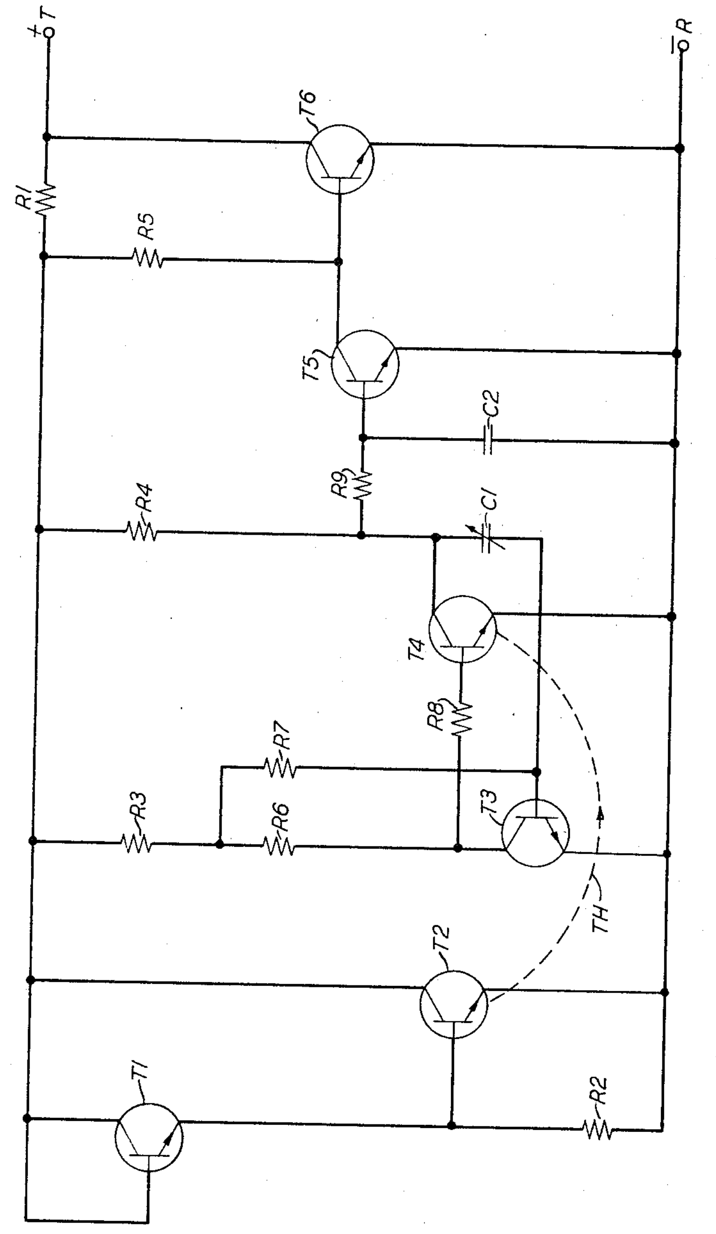
INVENTOR
H. J. BOLL
BY [signature]
ATTORNEY United States Patent Office 3,440,351
Patented Apr. 22, 1969

3,440,351

TELEPHONE TRANSMITTER CIRCUIT EMPLOYING VARIABLE CAPACITANCE MICROPHONE

Harry J. Boll, Berkeley Heights, N.J., assignor to Bell Telephone Laboratories, Incorporated, Murray Hill, N.J., a corporation of New York Filed Sept. 9, 1966, Ser. No. 578,267
Int. Cl. H04m 1/00
U.S. Cl. 179—1 10 Claims

ABSTRACT OF THE DISCLOSURE

An amplifier for increasing the detected output of a capacitive-microphone-modulated carrier is made insensitive to instantaneous line voltage variations by a decoupling arrangement that utilizes part of the carrier oscillator, with a thermally responsive path to maintain the balance between decoupling stages.

This invention relates to transistor amplifier circuits and more particularly to amplifier circuits for variable capacitance electroacoustic or electromechanial transducers.

In variable capacitance transducers the capacitance magnitude of a capacitive element is typically varied at an audio frequency rate in response to applied audio frequency mechanical energy, as in a phonograph pickup, or in response to applied audio frequency acoustic energy, as in a microphone. The varying capacitance is then employed to modulate the output of a high frequency oscillator, in terms of either frequency or amplitude, and a discriminator or detector circuit translates the modulation into an audio frequency signal. An illustrative system of this type is shown by R. H. Dicke in U.S. Patent 2,532,060 issued Nov. 28, 1950.

In comparison to other types of transducers, a capacitance transducer has certain important advantages. For example, carbon granule transmitters of the type conventionally employed in telephone station sets are subject to irregularities in transmission characteristcs owing to uneven packing of the granules. Such packing defects typically occur in the transmitters of wall telephone or similar station arrangements that involve vertical positioning of the handset and its transmitter over long periods. A capacitance microphone is at least as rugged as a carbon microphone, is typically lower in cost and, of particular importance, is not subject to carbon packing problems. Despite these advantages, capacitance microphones have not heretofore been developed for commercial use in the telephone field owing, in part, to their very low efficiency and the attendant need for amplification.

It would appear that the ready availability of low cost transistor amplifiers, particularly those fabricated by integrated circuit techniques, would automatically overcome any objection to capacitance transducers based on the need for amplification. The problem, however, is not that simple. Transistor amplifier circuitry heretofore proposed for such use generally requires a number of reactive circuit elements, either capacitors or inductors or both, and, as a result, the savings in both cost and size that typify solid state integrated circuitry cannot fully be realized.

Another aspect of the problem, particularly pertinent to the telephone art, lies in the fact that in a telephone transmitter amplifier, the audio output is in effect being transmitted to the D.C. power supply source, i.e. the central office. In contrast, in most other transducer amplifier arrangements there is an internal power supply together with a pair of input terminals and a separate pair of output terminals. Consequently, in a telephone transmitter amplifier employing transistors that require a substantially steady source of D.C. bias, some means must be provided to separate or decouple the steady state D.C. supply from the audio frequency component that is superimposed upon it.

Decoupling may of course readily be achieved by the use of filters employing large capacitors. This solution is unacceptable, however, from the standpoint of both cost and component size. The advantages inherent in the use of integrated circuit techniques for the remainder of the circuitry are clearly overshadowed by the disadvantages of employing large capacitors.

Accordingly, an object of the invention is to reduce the number of reactive circuit elements in amplifier circuits for capacitance transducers.

Another object is to effectively decouple a steady state D.C. component from a superimposed audio signal, without employing filter circuits, in a transducer amplifier circuit in which the D.C. supply is applied across the output of the transmission line.

These and other objects are achieved in accordance with the principles of the invention in a capacitance microphone amplifier employing an oscillator circuit with multifunction circuit components. These components are uniquely interconnected first, to generate a high frequency R-F signal that is amplitude modulated by the capacitance changes of the microphone; second, to detect changes in R-F amplitude, translating such changes into audio frequency voltage changes; and third, to function as a part of a decoupling circuit that ensures isolation of the steady state D.C. line terminal voltage from the superimposed audio frequency signal.

In accordance with one aspect of the invention a desirable impedance match is achieved in a unique manner between a capacitive transducer and a transistor output amplifier. Despite the fact that the impedance of the transducer at audio frequencies is inherently high and the input impedance of the transistor amplifier is inherently low, a suitable match is ensured by connecting the transducer in a high frequency oscillator circuit and, at the generated frequency, the impedance of the transducer is reduced to a level that provides a close match with the input impedance of the amplifier.

A feature of the invention involves a unique combination of two decoupling stages that prevent the audio frequency variations in the amplifier output from interfering with the operation of the oscillator. The first stage of decoupling is provided by a pair of resistors, a diode and a transistor connected between the network terminals. The second stage of decoupling is provided by a resistive network and a transistor connected in shunt with the first decoupling circuit. The second decoupling transistor performs a second function, as indicated above, as one of the two active elements in the transistor oscillator. The transistor of the first decoupling stage and the output stransistor of the oscillator are uniquely connected by a thermal delay path that serves to accommodate a wide range of D.C. line current and compensates for unavoidable manufacturing vairations in individual circuit components. The time constant of the thermal path is made sufficiently long to prevent audio frequency current from affecting the operation of the feedback path.

The principles of the invention as well as additional objects and features thereof will be fully apprehended from the following detailed description of an illustrative embodiment and from the drawing in which the signal figure is a schematic diagram of a circuit in accordance with the invention.

The circuit shown in the drawing is suitable for use as a part of the speech network in a subscriber's telephone set and the following description of the circuit is made in the context of that environment. The principles of the invention are in no way restricted to such employment, however, but instead are equally applicable to any transducer amplifier involving similar requirements.

The oscillator portion of the circuit comprises transistors T3 and T4. The collector of transistor T3 is connected to the base of transistor T4 through the resistor R8. Oscillation occurs as the result of feedback from transeistor T4 to transistor T3 by way of the capacitance microphone C1. The capacitance microphone or transmitter C1 may be any one of a variety of acoustic or mechanical pressure responsive devices whose capacitance varies in accordance with applied energy, such as the device disclosed in the Dicke patent cited above, for example. Audio frequency variations of C1 result in amplitude variations of the R-F oscillation. The R-F amplitude variations result in corresponding audio frequency variations in the collector current of transistor T4 owing to the fact that transistors T3 and T4 are operated in a nonlinear mode.

In effect, transistor T4 serves a dual function as a detector as well as performing as an active element in the oscillator circuit. The audio frequency signal is applied to the input of the transistor amplifier, comprising transistors T5 and T6, by way of the coupling resistor R9. An R-F bypass capacitor C2 provides a shunt path for R-F frequencies and prevents overloading the amplifier. As shown, the collector-emitter junction of amplifying transistor T6 is connected directly across the terminals T and R. The resistor R5 in combination with the resistor R1 determines the bias voltage on the base of transistor T5 while the combination of the resistors R1, R4 and R9 determines the bias voltage on the base of transistor T5. Coupling between transistors T5 and T6 is direct.

In a D.C. coupled amplifier of the type shown, which may have a gain of 1000, for example, it is essential that the D.C. operating point be established within a relatively narrow margin, such as one-half volt. To meet this requirement the biasing voltage on the base of transistor T5 would have to be maintained within plus or minus one-half millivolt. It is therefore evident that additional circuit means must be employed to stabilize the D.C. operating point of the amplifier. Stated otherwise, the problem is to maintain the biasing voltage on the base of transistor T5 at a constant value independent of what the instantaneous line voltage happens to be. Stabilization is achieved in accordance with the invention and in a manner described in detail hereinbelow by means of thermal coupling between transistors T2 and T4.

A two-stage decoupling circuit effectively prevents the audio frequency variations appearing in the output from interfering with the oscillator as indicated above. The first stage of decoupling is comprised of resistor R1, transistor T1, resistor R2 and transistor T2. Transistor T1 has a shorting path between its collector and base electrodes and accordingly functions as a diode connected between the base of transistor T2 and the tie point of resistor R1. Transistor T1 is utilized in the manner shown in lieu of a diode so that all of the solid state elements employed in the circuit may be identical, which greatly simplifies fabrication of the circuit by integrated circuit techniques. In operation, current flows through transistor T1 as a result of current flow through resistor R2 and the base current of transistor T2. The A.C. impedance of transistor T1 is very low compared to the input impedance presented by the base of transistor T2. Thus, in effect, except for the D.C. drop across transistor T1, the base of transistor T2 is connected to the tie point of resistor R1 insofar as A.C. is concerned. Transistor T1 performs as a rectifying junction.

The A.C. impedance at transistor T2 that is presented to the tie point of resistor R1 is also very low in comparison with the resistance of resistor R1 and the A.C. voltage at the collector of transistor T2 is thus substantially reduced compared to the A.C. voltage on the line.

As a result, the D.C. collector voltage of transistor T2 is maintained at a level of approximately 1.4 volts which corresponds to the voltage drop across two forward biased p-n junctions. These junctions are the emitter-base diode of transistors T2 and the emitter-base diode of transistor T1.

As indicated above, a single stage of decoupling is insufficient to maintain the base voltage of transistor T5 to the required tolerance. In accordance with the invention, a second stage of decoupling is provided by the combination of one of the oscillator transistors T3 with the resistive network that includes resistors R3, R6 and R7. Transistor T3 thus, in effect, performs a dual function.

In accordance with the invention, transistors T2 and T4 are placed in close physical proximity with a thermal delay path TP therebetween. These transistors may, for example, be deposited on the same glass substrate. To understand fully the function of the thermal path TP, it is first necessary to be aware of the part played by transistor T6 in maintaining a constant steady state D.C. operating voltage across the terminals T and R. In accordance with the invention, transistor T5 is normally maintained in a fully conducting state and transistor T6 is essentially cut off. With transistor T6 cut off, any significant rise in line voltage causes a relatively high flow of current through resistor R1. This high current, which also flows through transistor T2, dissipates substantial power which is converted into heat, the temperature of transistor T2 rises and heat is transmitted by the thermal path TP to transistor T4. Before transistor T4 attains the temperature of transistor T2, however, there is a brief delay which may be on the order of one-tenth of a second for example. As the temperature of transistor T4 increases, it starts to conduct more heavily and the base voltage of transistor T5 becomes more negative. Accordingly, the collector of transistor T5 becomes more positive causing transistor T6 to conduct, thus bringing the line voltage down and providing the desired operating point stabilization.

The two decoupling stages described above perform in effect as a high pass filter inasmuch as the time delay introduced by the thermal path TP is very long compared to a cycle of audio frequency. As a result, the negative feedback path from the collector of transistor T6 through resistor R1, transistor T2 and thence through the thermal loop TP to transistor T4 is ineffective insofar as audio frequency signals are concerned.

It is to be understood that the embodiment described herein is merely illustrative of the principles of the invention. Various modifications thereto may be effected by persons skilled in the art without departing from the spirit and scope of the invention.

What is claimed is:

1. A telephone transmitter circuit including a pair of output terminals connectable to a telephone line comprising, in combination, a transducer having a capacitance variable in response to applied acoustic energy, an oscillator for generating a high frequency output amplitude modulated by the output of said transducer, means including a portion of said oscillator circuit for translating the amplitude variations of said high frequency output into varying D.C. voltage corresponding to said acoustic energy, an amplifier for amplifying said voltage and applying an amplified output to said telephone line, first and second decoupling circuits for preventing the audio frequency variations on said telephone line from interfering with the operation of said amplifier and a thermal delay path connected between said decoupling circuits for ensuring substantially constant telephone line voltage irrespective of D.C. line current.

2. Apparatus in accordance with claim 1 wherein said oscillator comprises first and second transistors, means including a resistive element connecting the base of said second transistor to the collector of said first transistor, means including said transducer connecting the base of said first transistor to the collector of said second transistor, and a feedback path for said amplifier including said delay path.

3. Apparatus in accordance with claim 2 wherein said feedback path further includes at least a portion of said decoupling circuits and wherein said thermal delay path is connected between an element of said first decoupling circuit and said second transistor of said oscillator.

4. Apparatus in accordance with claim 2 wherein said first decoupling circuit includes a resistive element, a diode and a transistor, said last named resistive element being connected between one of said terminals and the collector of said last named transistor, the emitter of said last named transistor being connected to the other of said terminals, said diode being connected between the collector and base of said last named transistor, said last named transistor and said second transistor being in close physical proximity, said thermal delay path being connected between said second transistor and said transistor of said first decoupling circuit.

5. Apparatus in accordance with claim 4 wherein said second decoupling circuit comprises first and second resistors in series relation connected between the collector of said first transistor of said oscillator and the collector of said transistor of said first decoupling circuit, a third resistor connected between the base of said first transistor of said oscillator and the junction of said first and second resistors and further including said first transistor of said oscillator.

6. A circuit for converting audio frequency mechanical energy or audio frequency acoustic energy into a corresponding amplified audio frequency electrical signal comprising, in combination, first and second terminals for connecting said circuit to a transmission line that also supplies D.C. current for said circuit, means for generating a high frequency signal, means including a capacitance type transducer responsive to applied audio frequency energy for modulating the amplitude of said signal at a corresponding audio frequency rate, means including a portion of said generating means for detecting an electrical signal coresponding to said applied energy, and means for amplifying said electrical signal and for applying the amplified signal across said terminals, said amplifying means including a feedback path completed by a thermal delay path for stabilizing the level of steady state D.C. potential across said terminals.

7. Apparatus in accordance with claim 6 wherein said amplifying means includes first and second transistors, said second transistor having emitter and collector electrodes each connected to a respective one of said terminals, means connecting the collector of said first transistor to the base of said second transistor, and means connecting the output of said generating means to the base of said first transistor.

8. Apparatus in accordance with claim 6 wherein said generating means comprises an oscillator circuit including first and second transistors, a resistive element connecting the collector of said first transistor to the base of said second transistor, means including said transducer connecting the base of said first transistor to the collector of said second transistor, said portion of said generating means comprising said second transistor, and means connecting the collector of said second transistor to the input of said amplifying means.

9. Apparatus in accordance with claim 8 including first and second decoupling circuits for preventing audio frequency output signals from interfering with the operation of said oscillator, said first decoupling circuit including a transistor connected in said feedback path and said second decoupling circuit including said first transistor of said oscillator.

10. Apparatus in accordance with claim 9 wherein said thermal delay path is connected between said transistor of said first decoupling circuit and said second transistor of said oscillator, the delay of said path being sufficient to prevent negative feedback at audio frequencies.

References Cited

UNITED STATES PATENTS

| | | | |
|---|---|---|---|
| 2,532,060 | 11/1950 | Dicke | 179—106 |
| 3,005,956 | 10/1961 | Grant | 330—14 |
| 3,199,041 | 8/1965 | Peretz | 330—22 |
| 3,372,235 | 3/1968 | Weingartner. | |
| 3,383,612 | 5/1968 | Harwood | 330—22 |
| 3,393,328 | 7/1968 | Meadows | 307—303 |

KATHLEEN H. CLAFFY, *Primary Examiner.*

ROBERT P. TAYLOR, *Assistant Examiner.*

U.S. Cl. X.R.

307—303; 330—22